US012803614B2

(12) United States Patent
Gao et al.

(10) Patent No.: US 12,803,614 B2
(45) Date of Patent: Nov. 17, 2026

(54) SIGNAL TRANSMISSION APPARATUS AND ELECTRONIC DEVICE

(71) Applicant: Lenovo (Beijing) Limited, Beijing (CN)

(72) Inventors: Ying Gao, Beijing (CN); Hai Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 410 days.

(21) Appl. No.: 18/608,594

(22) Filed: Mar. 18, 2024

(65) Prior Publication Data

US 2024/0313819 A1 Sep. 19, 2024

(30) Foreign Application Priority Data

Mar. 17, 2023 (CN) ........................ 202310274354.4

(51) Int. Cl.
*H04B 1/40* (2015.01)
*H04B 1/3827* (2015.01)
*H01Q 1/52* (2006.01)

(52) U.S. Cl.
CPC ............. *H04B 1/40* (2013.01); *H04B 1/3827* (2013.01); *H01Q 1/526* (2013.01)

(58) Field of Classification Search
CPC .......... H04B 1/40; H04B 1/3827; H04B 1/04; H01Q 1/526; H01Q 1/243; G09F 9/00
See application file for complete search history.

(56) References Cited

U.S. PATENT DOCUMENTS

2011/0241794 A1* 10/2011 Pao ...................... H05K 1/0253 29/842
2020/0044679 A1* 2/2020 Heo ...................... H05K 1/025

* cited by examiner

*Primary Examiner* — Ankur Jain
(74) *Attorney, Agent, or Firm* — ANOVA LAW GROUP, PLLC

(57) ABSTRACT

A signal transmission apparatus includes a carrier and a signal reception and transmission assembly. The carrier includes a first thickness area and a second thickness area connected to the first thickness area. A thickness of the first thickness area is greater than a thickness of the second thickness area. A distance between a first surface of the first thickness area and a second surface of the second thickness area along a thickness direction of the carrier is greater than the thickness of the second thickness area. The first surface of the first thickness area and the second surface of the second thickness area are located on two surfaces of the carrier opposite to each other. The signal reception and transmission assembly include a reception and transmission module and a connection module. The reception and transmission module is communicatively connected to the connection module.

17 Claims, 5 Drawing Sheets

SIGNAL TRANSMISSION APPARATUS AND ELECTRONIC DEVICE

CROSS-REFERENCE TO RELATED APPLICATION

The present disclosure claims priority to Chinese Patent Application No. 202310274354.4, filed on Mar. 17, 2023, the entire content of which is incorporated herein by reference.

TECHNICAL FIELD

The present disclosure relates to a signal transmission apparatus and an electronic device.

BACKGROUND

With further integration of electronic devices, the electronic devices become smaller and smaller. A signal transmission apparatus with a signal reception and transmission function is large. It is desired to provide a signal transmission apparatus that can be arranged in the electronic devices by using the space of the electronic device appropriately.

SUMMARY

An aspect of the present disclosure provides a signal transmission apparatus including a carrier and a signal reception and transmission assembly. The carrier includes a first thickness area and a second thickness area connected to the first thickness area. A thickness of the first thickness area is greater than a thickness of the second thickness area. A distance between a first surface of the first thickness area and a second surface of the second thickness area along a thickness direction of the carrier is greater than the thickness of the second thickness area. The first surface of the first thickness area and the second surface of the second thickness area are located on two surfaces of the carrier opposite to each other. The signal reception and transmission module includes a reception and transmission module and a connection module. The reception and transmission module is communicatively connected to the connection module. The reception and transmission module is arranged on the first surface of the first thickness area. The connection module is arranged at the carrier.

An aspect of the present disclosure provides an electronic device including a housing, a display panel, and a signal transmission apparatus. A display panel is arranged with a first gap between the display panel and the housing along an extension direction of the display panel. The signal transmission apparatus includes a carrier and a signal reception and transmission assembly. The carrier includes a first thickness area and a second thickness area connected to the first thickness area. A thickness of the first thickness area is greater than a thickness of the second thickness area. A distance between a first surface of the first thickness area and a second surface of the second thickness area along a thickness direction of the carrier is greater than the thickness of the second thickness area. The first surface of the first thickness area and the second surface of the second thickness area are located on two surfaces of the carrier opposite to each other. The signal reception and transmission assembly includes a reception and transmission module and a connection module. The reception and transmission module is communicatively connected to the connection module. The reception and transmission module is arranged on the first surface of the first thickness area. The connection module is arranged at the carrier.

REFERENCE NUMERALS

Figure 1:
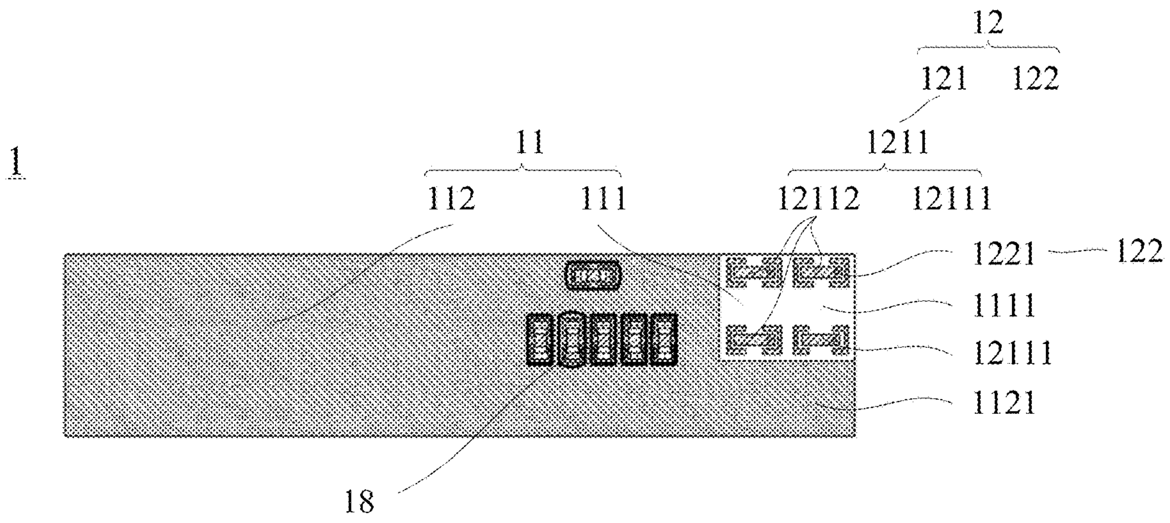
FIG. 1 illustrates a schematic diagram showing a front side of a signal transmission apparatus according to some embodiments of the present disclosure.

| | | |
|---|---|---|
| 1 Signal transmission apparatus | 11 Carrier | 111 First thickness area |
| 1111 First surface of first thickness area | 1112 Second surface of first thickness area | |
| 112 Second thickness area | 1121 First surface of second thickness area | |
| 1122 Second surface of second thickness area | | |
| 12 Signal reception and transmission assembly | 121 Reception and transmission module | |
| 1211 Signal reception and transmission member | 12111 Signal transmission member | |
| 12112 Signal reception member | 122 Connection module | |
| 1221 First connection unit | 1222 Second connection unit | 12221 Wire |
| 13 Processing assembly | 14 Ground layer | 15 Shield layer |
| 16 Transmission wire layer | 17 Shield structure | 18 Other electronic components |
| 2 Electronic device | 21 Housing | 22 Display panel |
| 23 Glass | a First gap | b Second gap |

DETAILED DESCRIPTION OF THE EMBODIMENTS

To make the purposes, technical solutions, and advantages of the present disclosure clearer, the technical solutions in embodiments of the present disclosure are described in conjunction with accompanying drawings in embodiments of the present disclosure. The described embodiments are only some embodiments not all the embodiments of the present disclosure.

In the specification of the present disclosure, the terms “first” and “second” are merely used for descriptive purposes and should not be understood as indicating or implying relative importance or implicitly indicating a number of the indicated technical features. Therefore, a feature associated with “first” or “second” may explicitly or implicitly include one or more of such features. In the specification of the present disclosure, “a plurality of” means two or more than two, unless otherwise specified.

In addition, in embodiments of the present disclosure, orientation terms such as “upper,” “lower,” “left,” and “right” are defined relative to the orientations in which the members in the drawings are schematically placed. The directional terms are relative concepts and are used to describe and explain relative description and clarification, which may change accordingly according to changes in the orientation of the members in the drawings.

In embodiments of the present disclosure, unless otherwise clearly stated and limited, the term “connection” should be understood in a broad sense. For example, a “connection” can be a fixed connection, a detachable connection or an integral body, a direct connection, or an indirect connection through intermedium.

In embodiments of the present disclosure, the terms “comprising,” “including,” or any other variation thereof are intended to cover a non-exclusive inclusion, such that a process, method, article, or apparatus that includes a list of elements not only includes those elements, but also includes other elements not expressly listed or elements inherent to the process, method, article, or apparatus. Without further limitation, an element defined by the sentence “comprising a . . . ” does not exclude the presence of additional identical elements in the process, method, article, or apparatus that includes those elements.

In embodiments of the present disclosure, words such as “exemplary” or “for example” are used to represent examples, illustrations, or explanations. Any embodiment or design described as “exemplary” or “such as” in embodiments of the present disclosure is not to be construed as preferred or advantageous over other embodiments or designs. The terms “exemplary” or “such as” are intended to present the concept in a specific manner.

Embodiments of the present disclosure provide an electronic device. The electronic device can include a housing, a display panel, and a signal transmission apparatus. In embodiments of the present disclosure, types of the electronic device are not limited. In some embodiments, the electronic device can include an electronic device with a display function such as a laptop computer, a tablet, a cell phone, or a TV.

In embodiments of the present disclosure, types of the signal transmission apparatus are not limited. For different types of electronic devices, the types of the signal transmission apparatus can be different. For example, for the tablet or cell phone, the signal transmission apparatus can be an apparatus configured to receive or transmit a communication signal. In addition, for the laptop computer, tablet, or cell phone, the signal transmission apparatus can be an apparatus for collecting image information, and an apparatus for collecting sound information, such as a camera or a microphone.

In addition, some electronic devices can use radar to identify a user position to cause the electronic device to execute a corresponding action according to a corresponding instruction. In some embodiments of the present disclosure, the signal transceiver can be a radar apparatus.

Compared to the electronic devices currently trending towards integration, the signal transmission apparatus is generally relatively large. In the existing electronic devices, the signal transmission apparatuses occupy a relatively large space in the electronic devices, which results in wasted internal space and affects the arrangement of other members within the electronic devices.

Figure 2:
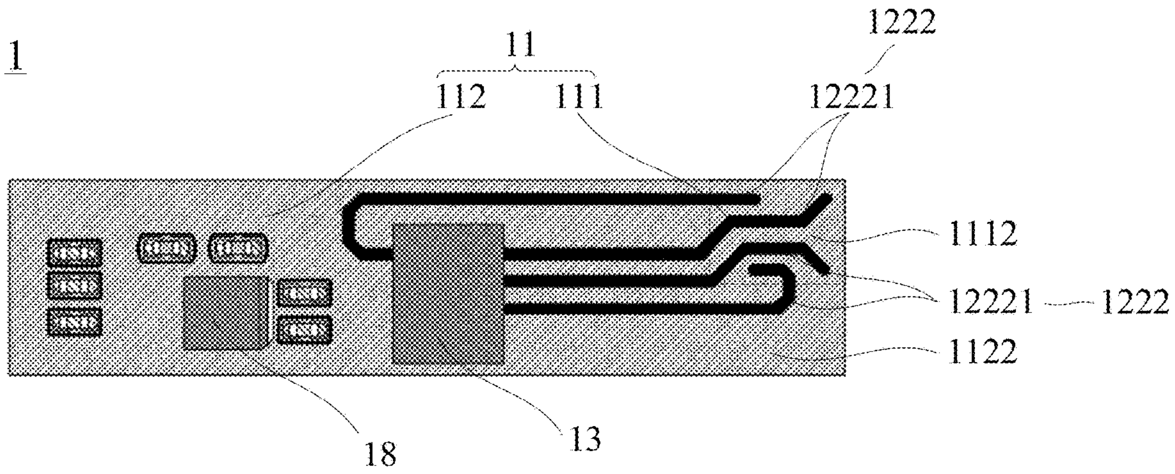
FIG. 2 illustrates a schematic diagram showing a back side of a signal transmission apparatus according to some embodiments of the present disclosure.

Thus, embodiments of the present disclosure further provide a signal transmission apparatus. In some embodiments, as shown in FIG. 1 and FIG. 2, the signal transmission apparatus 1 includes a carrier 11 and a signal reception and transmission assembly 12. The carrier 11 can have a first thickness area 111 and a second thickness area 112 connected to the first thickness area 111. The thickness of the first thickness area 111 is larger than the thickness of the second thickness area 112. A distance between a first surface of the first thickness area 1111 and a second surface of the second thickness area 1122 along a thickness direction is larger than the thickness of the second thickness area 112. The first surface of the first thickness area 1111 and the second surface of the second thickness area 1122 are located on two surfaces of the carrier 11 opposite to each other, respectively. The signal reception and transmission assembly 12 includes a reception and transmission module 121 and a connection module 122. The reception and transmission module 121 is communicatively connected to the connection module 122. The reception and transmission module 121 is arranged on the first surface of the first thickness area 1111, and the connection module 122 is arranged at the carrier 11.

In embodiments of the present disclosure, types of the carrier 11 are not limited. The carrier 11 can provide a mounting base for the signal reception and transmission assembly 12. A plurality of structures can have the above function, such as a printed circuit board (PCB) or a flexible printed circuit (FPC). In some other embodiments, other insulation plate-shaped structures can be used as the carrier 11 in embodiments of the present disclosure, electronic components mounted on the carrier 11 can be connected through wires.

Furthermore, as shown in FIG. 1, the carrier 11 of embodiments of the present disclosure has the first thickness area 111 and the second thickness area 112, and the first thickness area 111 and the second thickness area 112 are connected. The first thickness area 111 and the second thickness area 112 can be formed as an integral structure. In some other embodiments, or the first thickness area 111 and the second thickness area 112 can be formed separately. Then, the first thickness area 111 and the second thickness area 112 can be connected. In addition, the distance between the first surface of the first thickness area 1111 and the second surface of the second thickness area 1122 is larger than the thickness of the second thickness area 112 along the thickness direction of the carrier 11. The first surface of the first thickness area 1111 and the second surface of the second thickness area 1122 can be located on two surfaces of the carrier 11 opposite to each other.

A plurality of electronic components can be mounted at the carrier 11. Correspondingly, the carrier 11 can be arranged in a flat plate-shaped structure. Thus, the thickness direction of the carrier 11 can be a thickness direction corresponding to a structure shape of the carrier 11. In addition to the flat plate-shaped structure, the carrier 11 can be configured in another structure. The thickness direction of the carrier 11 can be a direction perpendicular to an extension direction of a surface of the carrier 11 for mounting the electronic components.

In addition, in embodiments of the present disclosure, the arrangement of the first thickness area 111 and the second thickness area 112 along the thickness direction of the carrier 11 is not limited. To facilitate description, the first surface of the first thickness area 1111, the second surface of the first thickness area, the first surface of the second thickness area 1121, and the second surface of the second thickness area 1122 can be described first.

In some embodiments, as shown in FIG. 1 and FIG. 2, the first surface of the first thickness area 1111 is a surface of the first thickness area 111 where the reception and transmission module 121 is arranged. The second surface of the first thickness area 1112 is a surface along the thickness direction of the carrier 11 opposite to the first surface of the first thickness area 1111. The first surface of the second thickness area 1121 is a surface, which is on the same side along the thickness direction of the carrier 11 as the first surface of the first thickness area. The second surface of the second thickness area 1122 is a surface, which is on the same side along the thickness direction of the carrier 11 with the second surface of the first thickness area. In addition, the second surface of the second thickness area 1122 can also be a surface, which is opposite to the first surface of the second thickness area 1121 along the thickness direction. Thus, when the carrier 11 only includes the first thickness area 111 and the second thickness area 112, the first surface of the first thickness area 1111, the first surface of the first thickness area 1111, the first surface of the second thickness area 1121, and a connection surface between the first surface of the first thickness area 1111 and the first surface of the second thickness area 1121 can form a surface of the carrier 11. The second surface of the first thickness area 1112, the second surface of the second thickness area 1122, and a connection surface between the second surface of the first thickness area 1112 and the second surface of the second thickness area 1122 can form another surface of the carrier 11.

Based on this, the first thickness area 111 and the second thickness area can have various arrangements along the thickness direction of the carrier 11, as long as the distance between the first surface of the first thickness area 1111 and the second surface of the second thickness area 1122 is greater than the thickness of the second thickness area 112 along the thickness direction of the carrier 11.

For example, the second surface of the first thickness area 1112 can be arranged between the first surface of the second thickness area 1121 and the second surface of the second thickness area 1122. In some embodiments, the second surface of the first thickness area 1112 can be arranged on a side of the second surface of the second thickness area 1122 opposite to the first surface of the second thickness area 1121.

In embodiments of the present disclosure, the first surface of the first thickness area 1111 can be located on the side of the first surface of the second thickness area 1121 opposite to the second surface of the second thickness area 1122.

In embodiments of the present disclosure, the signal reception and transmission assembly 12 includes a reception and transmission module 121 and a connection module 122. In some embodiments, the reception and transmission module 121 can be configured to send or receive a signal. The connection module 122 can be configured to transmit the signal. The reception and transmission module 121 can be arranged on the first surface of the first thickness area 1111. The connection module 122 can be arranged at the carrier 11.

The connection module 122 being arranged at the carrier 11 can include the connection module 122 being arranged on a surface of the carrier 11, in an inner side of the carrier 11, or partially on the surface of the connection module 122 and partially on the surface of the carrier 11 means that the connection module 122 can be set on the surface of the carrier 11, inside the carrier 11, or partially on the surface of the carrier 11 and partially inside the carrier 11.

For example, when the signal transmission apparatus 1 is a camera, the reception and transmission module 121 can be the lens of the camera, and the connection module 122 can be a wire connecting the lens of the camera to other electronic components. When the signal transmission apparatus 1 is a radar, the reception and transmission module 121 can be an antenna of the radar, and the connection module 122 can be a wire connecting the antenna of the radar to other electronic components.

Thus, in the signal transmission apparatus 1 of embodiments of the present disclosure, the thickness of the first thickness area 111 can be set to be greater than the thickness of the second thickness area 112, and the first surface of the first thickness area 1111 can protrude from the first surface of the second thickness area 1121 along the thickness direction of the carrier 11. The reception and transmission module 121 of the signal reception and transmission assembly 12 can be arranged on the first surface of the first thickness area 1111. Thus, the reception and transmission module 121 can protrude from other electronic components, which can reduce the impact of the other electronic components on the signal transmission or reception of the reception and transmission module 121. The first thickness area 111 can be arranged in a small gap in the electronic device. In addition, the second thickness area 112 can overlap with the other members in the electronic device to reduce the space required for arranging the signal transmission apparatus 1 of embodiments of the present disclosure. Thus, the signal transmission apparatus 1 of embodiments of the present disclosure can sufficiently use the internal space of the electronic device to improve the adaptability of the signal transmission apparatus 1 of embodiments of the present disclosure.

To illustrate the signal transmission apparatus 1 of embodiments of the present disclosure the signal transmission apparatus 1 of embodiments of the present disclosure is described by taking the radar as an example according to the accompanying drawings.

Based on this, to facilitate preparing the carrier 11 of embodiments of the present disclosure and arranging the carrier 11 at the electronic device 2, as shown in FIG. 1 and FIG. 2, in embodiments of the present disclosure, the second surface of the first thickness area 1112 and the second surface of the second thickness area 1122 can be configured to satisfy a coplanar condition. The second surface of the first thickness area 1112 and the second surface of the second thickness area 1122 satisfying the coplanar condition can include the second surface 112 of the first thickness area and the second surface of the second thickness area 1122 being coplanar or nearly coplanar.

Through the above configuration, the preparation of the first thickness area 111 and the second thickness area 112 can be facilitated. For example, the first thickness area 111 and the second thickness area 112 can be formed into an integral structure, and the first thickness area 111 and the second thickness area 112 can be conveniently arranged on the same plane. Further, the arrangement of the signal transmission apparatus 1 of embodiments of the present disclosure can be facilitated.

Based on this, in some embodiments of the present disclosure, the signal transmission apparatus 1 can further include a processing assembly 13. In some embodiments, the processing assembly 13 can be configured to process the transmitted signal and the received signal of the reception and transmission module 121. For example, for the radar, the processing assembly 13 can be formed by a microcontroller unit (MCU), an application-specific integrated circuit (ASIC) chip, a preamplifier, and a mixer. The processing assembly can be configured to demodulate the signal of the radar and the echo signal of the radar. In other types of signal transmission apparatus 1, the processing assembly 13 can be formed by electronic components with different functions to process the signal.

As shown in FIG. 1 and FIG. 2, in some embodiments of the present disclosure, in addition to the reception and transmission module 121 and the processing assembly 13, the signal transmission apparatus 1 further includes other electronic components 18. Wires 12221 or other connection apparatuses can be arranged between the other electronic components 18 or between the other electronic components 18 and the reception and transmission module 121 or the processing assembly 13, which are not shown in the drawings.

In embodiments of the present disclosure, to facilitate the arrangement of the processing assembly and sufficiently use the arrangement space of the electronic components of the carrier 11, the processing assembly 13 can be arranged on the second surface of the second thickness area 1122. Thus, conflict between the processing assembly 13 and the reception and transmission module 121 can be avoided to reduce the mutual impact between the processing assembly 13 and the reception and transmission module 121.

Meanwhile, to communicative connection or electrical connection between the processing assembly 13 and the reception and transmission module 121, the connection module 122 of the signal transmission apparatus 1 of embodiments of the present disclosure can include a first connection unit 1221 and a second connection unit 1222. The first connection unit 1221 can be configured to communicatively or electrically connect the processing assembly 13 and the reception and transmission module 121 along the thickness direction of the carrier 11. The second connection unit 1222 can be configured to communicatively or electrically connect the processing assembly 13 and the reception and transmission module 121 along the surface of the carrier 11.

Figure 4:
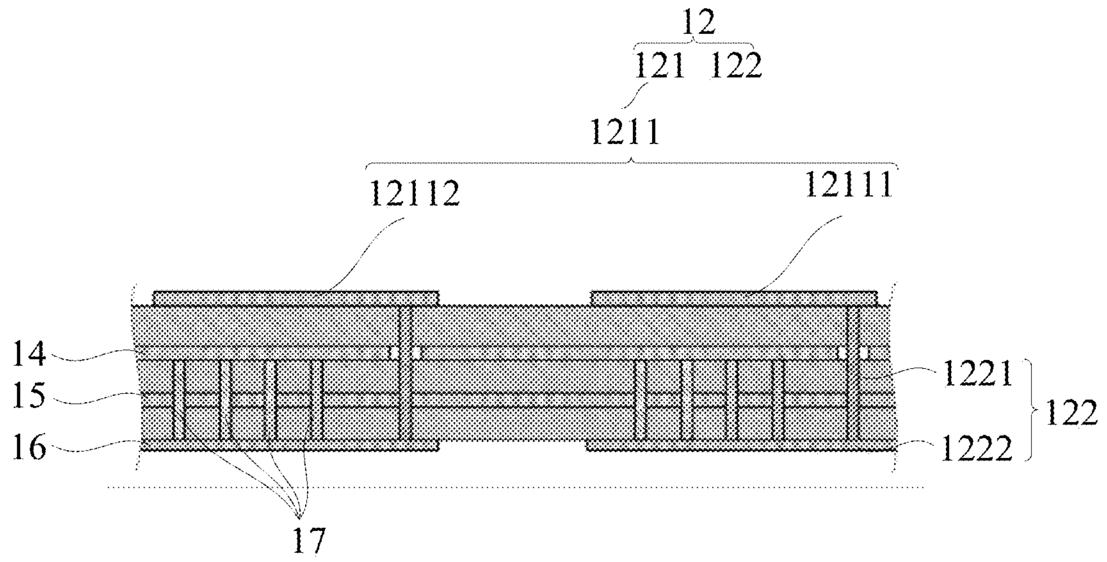
FIG. 4 illustrates a schematic cross-section diagram showing a first thickness area of a signal transmission apparatus according to some embodiments of the present disclosure.

In some embodiments, as shown in FIG. 4, a hole extending along the thickness direction of the carrier 11 is formed in the first thickness area 111. Two ends of the hole are located on the first surface of the first thickness area 1111 and the second surface of the first thickness area 1112. The first connection unit 1221 is arranged in the hole. To facilitate description, the end of the first connection unit 1221 located on the first surface of the first thickness area 1111 can be referred to as a first end of the first connection unit 1221, and the end of the first connection unit 1221 located on the second surface of the first thickness area 1112 can be referred to as a second end of the first connection unit 1221. Thus, the first end of the first connection unit 1221 can be directly connected to the reception and transmission module 121. The second end of the first connection unit 1221 can be communicatively or electrically connected to the processing assembly 13 through the second connection unit 1222.

In embodiments of the present disclosure, the first connection unit 1221 can be formed by preparing a structure similar to a cylindrical shell with a conductive material at an inner wall of the through hole. In addition, as shown in FIG. 4, the first connection unit 1221 is also formed by preparing a column-like structure with the conductive material in the hole. The wire 12221 can be formed with the conductive material on a surface of the carrier corresponding to a side of the second surface of the second thickness area 1122. The wire 12221 can be arranged between the second end of the first connection unit 1221 and the processing assembly 13 to form the second connection unit 1222.

In some embodiments, When the signal transmission apparatus 1 of embodiments of the present disclosure is a radar, the first connection unit 1221 can be configured to form coaxial feeding. The second connection unit 1222 can be configured to form coplanar waveguide transmission of signal transmission of the reception and transmission module 121 and the processing assembly 13.

Based on this, in some embodiments of the present disclosure, the first thickness area 111 and the second thickness area 112 can be multilayer structures. Thus, different functional layers can be adaptively configured between different layers. For example, a function circuit can be configured at a top layer and a bottom layer to lay out the main circuit and electronic components. A ground functional layer and a power supply functional layer can be configured at a middle layer. Thus, the disturbance of the signal of the reception and transmission module 121 can be better shielded.

In some embodiments of the present disclosure, thicknesses of layer structures of the first thickness area 111 and thicknesses of layer structures of the second thickness area 112 can be set to be the same. Thus, a number of layers of the first thickness area 111 can be set to be greater than a number of layers of the second thickness area 112. Thus, the thickness of the first thickness area 111 can be greater than the thickness of the second thickness area 112.

In addition, to facilitate the preparation of the interlayer structures of the first thickness area 111 and the interlayer structures of the second thickness area, each layer structure of the first thickness area 111 can be aligned with each layer structure of the second thickness area 112. A thickness of a layer structure of the first thickness area 111 close to the first surface of the first thickness area can be set to be greater than a thickness of a layer structure of the second thickness area 112 close to the first surface of the second thickness area 1121.

A layer structure of the first thickness area 111 being aligned with a layer structure of the second thickness area 112 can indicate that the layer structure of the first thickness area 111 overlaps or partially overlaps with the layer structure of the second thickness area 112 along a direction perpendicular to the thickness direction of the carrier 11. The layer structures of the first thickness area 111 can be aligned with the layer structures of the second thickness area 112, respectively. An upper surface of each layer structure and an upper surface of each layer structure of the second thickness area 112 can satisfy a coplanar condition, or a bottom surface of each layer structure of the first thickness area 111 and a bottom surface of each layer structure of the second thickness area 112 can satisfy the coplanar condition. Then, the thickness of the layer structure of the first thickness area 111 close to the first surface of the first thickness area 1111 can be set to be greater than the thickness of the layer structure of the second thickness area 112 close to the first surface of the second thickness area 1121. Thus, the thickness of the first thickness area 111 can be greater than the thickness of the second thickness area 112.

The above settings can facilitate different interlayer functional layers to satisfy the coplanar condition. Thus, the functional layers can be prepared conveniently.

Based on this, in embodiments of the present disclosure, a ground layer 14, a shield layer 15, and a transmission wire layer 16 can be arranged at the carrier 11 along the thickness direction of the carrier 11.

In some embodiments, a metal layer with a large area, such as a metal mesh or metal sheet, can be arranged within a plane along the thickness direction of the carrier 11 to form the ground layer 14. The ground layer 14 can cover a portion or an entire plane. Two or more ground layers 14 can be formed as needed.

Most of the electronic components mounted on the carrier 11 may need to be connected to a power grid. By arranging the ground layer 14, a return voltage of the electronic components can be conveniently returned through the ground layer 14, which simplifies the connection of each electronic component to the ground layer. In addition, a metal layer with a large area, such as a metal mesh or a metal sheet, can be formed on a plane at the carrier 11 along the thickness direction of the carrier 11 to form the shield layer 15. By arranging the shield layer 15, mutual disturbance between layers can be reduced to ensure signal integrity in the signal transmission path. Meanwhile, by setting a transmission wire layer 16, the communicative or electrical connection can be facilitated for different electronic components.

In addition, the second surface of the carrier 11 can be formed on the second surface of the first thickness area 1112 and the second surface of the second thickness area 1122. The transmission wire layer 16 can be arranged on the second surface of the carrier 11. The second connection unit 1222 can be arranged on the transmission wire layer 16. Thus, the transmission wire layer 16 can be arranged on the second surface of the carrier 11 to facilitate the configuration of the transmission wire layer 16 and the electronic components to be mounted to the carrier 11, which can reduce the connection structures between the layers.

In some embodiments of the present disclosure, the shield structure 17 can be arranged on both sides of the second connection unit 1222 along the thickness direction of the carrier 11. One end of the shield structure 17 can extend to the transmission wire layer 16, and the other end of the shield structure 17 can be connected to the ground layer 14.

Figure 5:
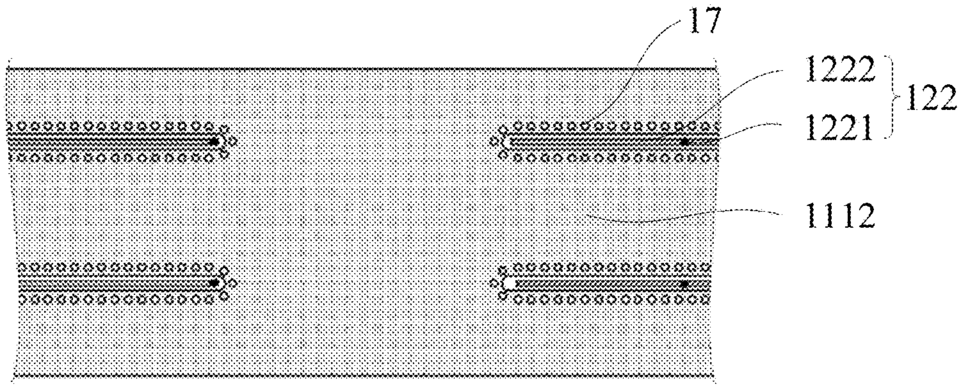
FIG. 5 illustrates a schematic diagram showing a layout of a second connection unit and a shield structure of a signal transmission apparatus according to some embodiments of the present disclosure.

For example, as shown in FIG. 4 and FIG. 5, a plurality of blind holes are configured at positions of the carrier 11 corresponding to the two sides of the second connection unit 1222. One end of the blind hole can extend to the transmission wire layer 16, and the other end of the blind hole can be connected to the ground layer 14. Meanwhile, the shield structure 17 can be formed by preparing a structure similar to a cylindrical shell at the inner wall of the blind hole with the conductive material. In addition, as shown in FIG. 4, the shield structure 17 is also formed by preparing a column structure in the blind hole with the conductive material. Further, to enhance the shield effect of the shield structure 17, a distance between two blind holes can be set to $\frac{1}{20}$ of a wavelength corresponding to a signal transmitted by the second connection unit 1222.

A metal mesh or a metal sheet extending between the transmission wire layer 16 and the ground layer 14 can be arranged at a position of the carrier 11 corresponding to the two sides of the second connection unit 1222 along the thickness of the carrier 11 to form the shield structure 17.

Figure 3:
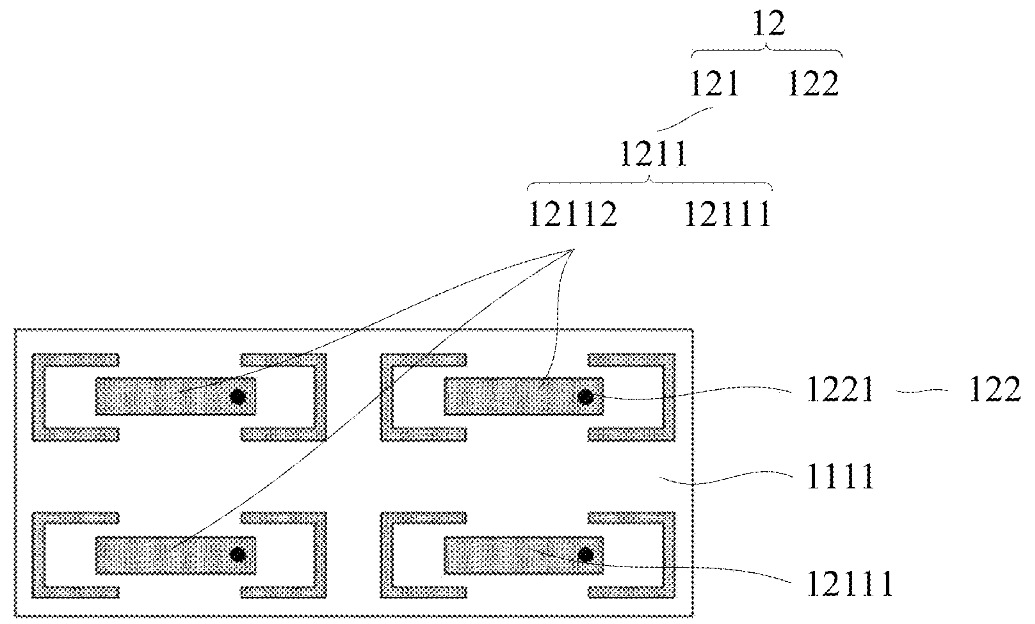
FIG. 3 illustrates a schematic diagram showing a layout of a first surface of a first thickness area of a signal transmission apparatus according to some embodiments of the present disclosure.

In addition, as shown in FIG. 1 and FIG. 3, in embodiments of the present disclosure, the reception and transmission module 121 includes a plurality of signal reception and transmission members 1211. The plurality of signal reception and transmission members 1211 are not on the same straight line. In embodiments of the present disclosure, a signal reception and transmission member 1211 can refer to an electronic component of the reception and transmission module 121 configured to transmit or receive a signal. For example, when the signal transmission apparatus of embodiments of the present disclosure is a camera, the signal transmission member can be the camera. When the signal transmission apparatus 1 of embodiments of the present disclosure is a radar, the signal transmission member can refer to a transmission antenna or a reception antenna of the radar.

In embodiments of the present disclosure, the signal reception and transmission members 1211 being not on the same straight line can indicate that at least one signal reception and transmission member 1211 of the plurality of signal reception and transmission members 1211 is not on the same straight line with the other signal reception and transmission members 1211 of the plurality of signal reception and transmission members 1211. For example, as shown in FIG. 1 and FIG. 3, the signal reception and transmission apparatus is the radar, the signal reception and transmission member 1211 can be the transmission antenna and the reception antenna, and four signal reception and transmission members 1211 are provided.

As shown in FIG. 1 and FIG. 3, when four signal reception and transmission members 1211 are provided, the signal reception and transmission members can be arranged with two rows and two columns. In some other embodiments, three signal reception and transmission members 1211 can be arranged on a straight line, and the other signal reception and transmission member 1211 can be arranged opposite to the straight line. In some other embodiments, the four signal reception and transmission members 1211 can also be arranged in a manner except on the same straight line. For a different number of signal reception and transmission members 1211, the signal reception and transmission members 1211 can be arranged according to the above description as long as not being arranged on the same straight line.

Based on this, the signal reception and transmission member 1211 can include a signal transmission member 12111 and a signal reception member 12112. In some embodiments, the signal transmission member 12111 can be configured to transmit a signal, and the signal transmission member 12112 can be configured to receive a signal. In some embodiments, when the signal transmission apparatus 1 of embodiments of the present disclosure is the radar, the signal transmission signal 12111 can be a transmission antenna, and the signal reception member 12112 can be a reception antenna. In embodiments of the present disclosure, at least two signal reception members 12112 can be provided.

Based on the above, the dimension of the signal obtained by the signal reception and transmission member 1211 can be increased, and the detection capability of the signal reception and transmission member 1211 can be increased. By taking the radar as an example, with the above configuration, the distance and the relative angle of the target object can be obtained.

In addition, as shown in FIG. 1, in embodiments of the present disclosure, to further facilitate the configuration of the signal transmission apparatus 1, the carrier 11 is configured as a rectangular structure, and the first thickness area 111 is arranged at the edges of the carrier 11 along a length direction and a width direction. Thus, the impact of other electronic components on the carrier 11 on the reception and transmission module 121 can be reduced.

The first thickness area 111 being arranged at the edges of the carrier 11 along the length direction and width direction can also be understood as arranging the first thickness area 111 near a corner of the rectangular carrier 11.

Figure 6:
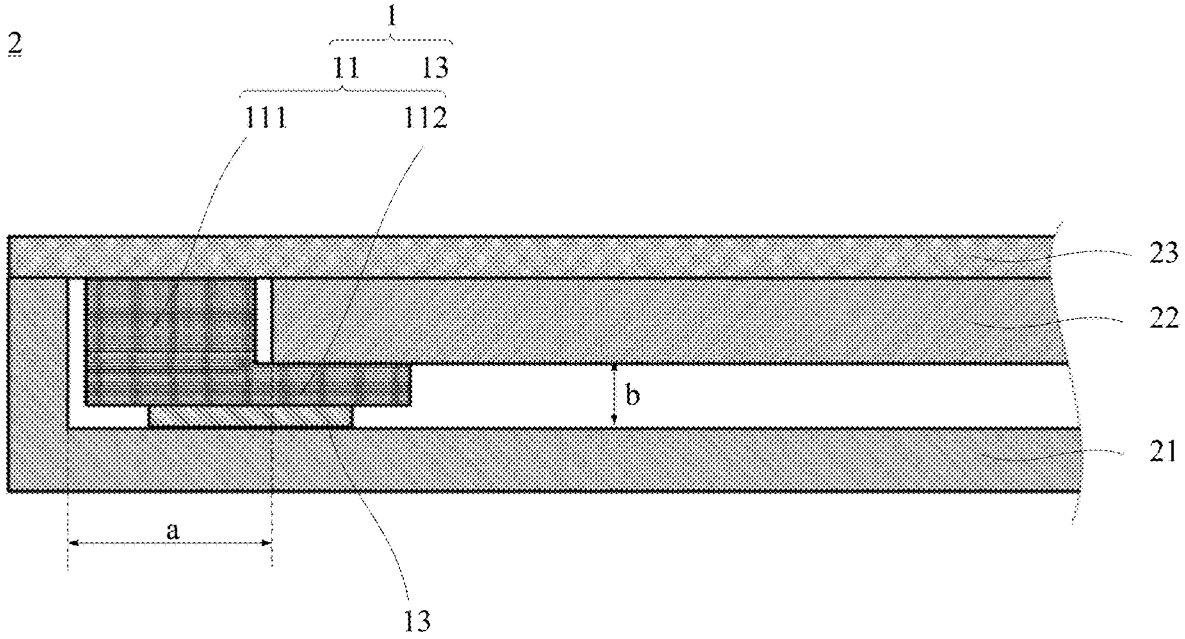
FIG. 6 illustrates a schematic diagram showing a layout (cross-section) of a signal transmission apparatus of an electronic device according to some embodiments of the present disclosure.
Figure 7:
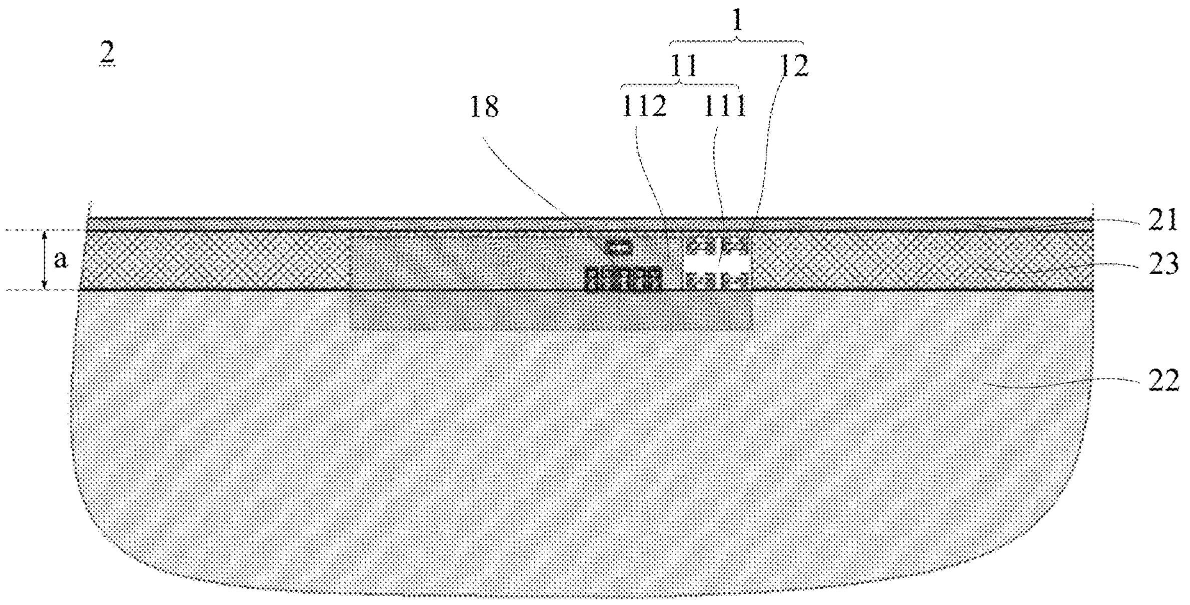
FIG. 7 illustrates a schematic diagram showing a layout (front side) of a signal transmission apparatus of an electronic device according to some embodiments of the present disclosure.

Based on this, embodiments of the present disclosure also provide an electronic device 2. As shown in FIG. 6 and FIG. 7, the electronic device 2 includes a housing 21, a display panel 22, and a signal transmission apparatus 1. The display panel 22 is arranged provided with a first gap a along the extension direction of the display panel 22 with the housing 21. The extension direction of the display panel 22 can refer to the extension direction of the plane where the display panel 22 is located. For example, in the reference system of FIG. 6, the extension direction of the display panel 22 refers to the horizontal direction. The signal transmission apparatus 1 includes a carrier 11 and a signal reception and transmission assembly 12. In some embodiments, the carrier 11 includes the first thickness area 111 and the second thickness area 112 connected to the first thickness area 111. The thickness of the first thickness area 111 can be greater than the thickness of the second thickness area 112. The signal reception and transmission assembly 12 includes a reception and transmission module 121 and a connection module 122. The reception and transmission module 121 can be communicatively or electrically connected to the connection module 122. The reception and transmission module 121 can be arranged on the first surface of the first thickness area 1111, and the connection module 122 can be arranged on the carrier 11. Moreover, the distance between the first surface of the first thickness area 1111 and the second surface of the second thickness area 1122 along the thickness direction of the carrier 11 can be greater than the thickness of the second thickness area 112. The first surface of the first thickness area 1111 and the second surface of the second thickness area 1122 can be located on opposite surfaces of the carrier 11. In addition, to facilitate distinguishment, the carrier 11 of the signal transmission apparatus 1 of the electronic device 2 can be referred to as a first carrier.

For the first carrier and the signal reception and transmission assembly of the electronic device 2 of embodiments of the present disclosure, reference can be made to the carrier 11 and the signal reception and transmission assembly 12 above.

Meanwhile, as shown in FIG. 6, in the electronic device 2 of embodiments of the present disclosure, the first thickness area 111 is arranged within the first gap a, and the signal reception and transmission assembly 12 does not exceed the enablement surface of the display panel 22. The enablement surface of the display panel 22 can refer to the surface of the display panel 22 configured to display images or the surface of the display panel 22 facing the user. For example, in the reference system of FIG. 6, the enablement surface of the display panel 22 refers to the upper surface of the display panel 22.

In addition, the thickness of the first thickness area 111 can also be adjusted according to the thickness of the display panel 22. The thickness of the first thickness area 111 can be increased or decreased to ensure that the signal reception and transmission assembly 12 do not exceed the enablement surface of the display panel 22.

Moreover, as shown in FIG. 6, the second thickness area 112 is arranged within a second gap b between the display panel 22 and the housing 21 along the thickness direction of the first carrier. Thus, the second thickness area 112 can partially or entirely overlap with the display panel 22 along the thickness direction of the first carrier to sufficiently use the space behind the display panel 22.

Through the above settings, since only the first thickness area 111 needs to be arranged within first gap a between the display panel 22 and the housing 21, the frame of the display panel 22 can be set smaller. Meanwhile, the second thickness area 112 can overlap with the display panel 22 along the thickness direction of the first carrier to set the size of the electronic device 2 to be small along the thickness direction of the first carrier.

As shown in FIG. 6, a layer of glass 23 is arranged on the enablement surface of the display panel 22 to protect the display panel 22 and the signal transmission apparatus 1. Moreover, signals transmitted or received by the signal transmission apparatus 1 can be transmitted through the glass 23.

Figure 8:
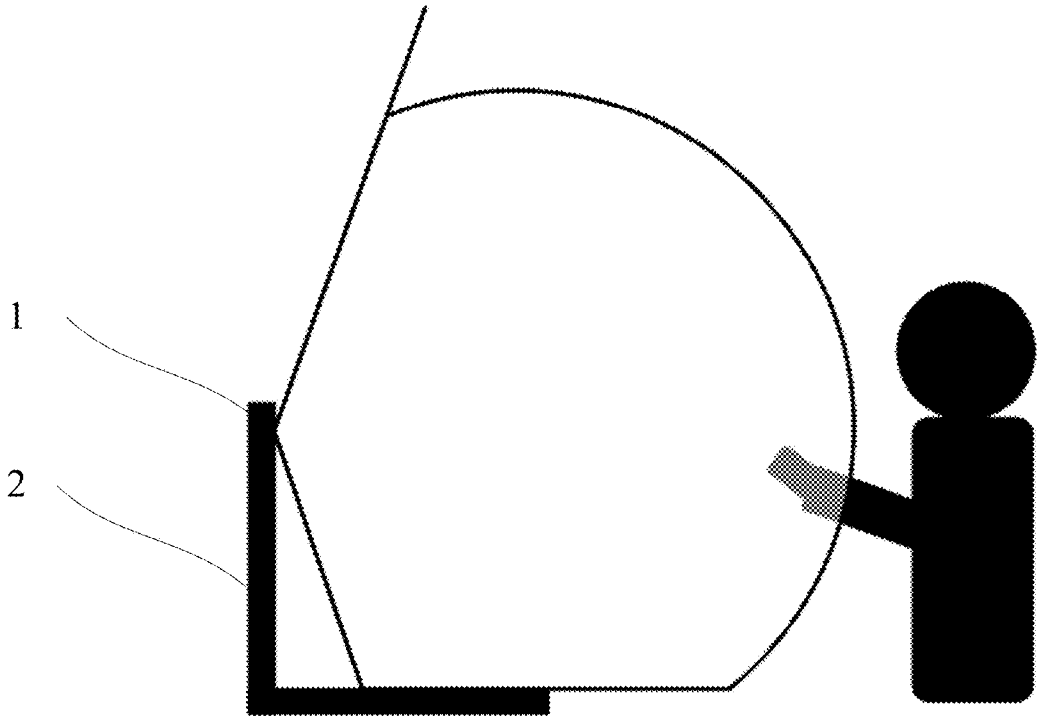
FIG. 8 illustrates a schematic diagram of an electronic device according to some embodiments of the present disclosure.

For example, as shown in FIG. 8, an example of the electronic device 2 is provided. When the signal transmission apparatus 1 is a camera or radar, the camera or radar can be close to the surface of the electronic device 2 as much as possible through the above configuration. Thus, the camera or radar can have a large field of view.

Based on this, in some embodiments of the present disclosure, the electronic device 2 can further include a second carrier. The second carrier can be configured to install other electronic components of the electronic device 2. For example, when the electronic device 2 is a laptop or a tablet, the second carrier can refer to the motherboard of the electronic device 2.

Furthermore, a third connection unit can be also arranged between the second carrier and the first carrier. The second carrier can be communicatively or electrically connected to the first carrier through the third connection unit. The third connection unit can be adaptively configured according to the relative position relationship between the first carrier and the second carrier. For example, When the first carrier and second carrier are relatively far opposite to each other, the third connection unit can be set as a flexible circuit board. One end of the flexible circuit board can be connected to the first carrier, and the other end can be connected to the second carrier. Thus, the first carrier and the second carrier can be electrically or communicatively connected through the flexible circuit board. When the first carrier and the second carrier are close to each other, the third connection unit can be a connection plug. For example, an expansion groove can be arranged at the second carrier, and an expansion connector can be arranged at the first carrier. The first carrier can be communicatively or electrically connected to the second carrier by connecting the expansion connector and the expansion groove.

Reference numbers of embodiments of the present disclosure are merely for description and do not represent the superiority or inferiority of the embodiments. Some embodiments of the present disclosure are described above and do not limit the scope of the present disclosure. Equivalent structural or equivalent process transformations made based on the contents of the present disclosure and drawings or the contents of the present disclosure directly used in other related fields are within the scope of the present disclosure.

What is claimed is:

1. A signal transmission apparatus comprising:

a carrier including a first thickness area and a second thickness area connected to the first thickness area, wherein a thickness of the first thickness area is greater than a thickness of the second thickness area, a distance between a first surface of the first thickness area and a second surface of the second thickness area along a thickness direction of the carrier is greater than the thickness of the second thickness area, and the first surface of the first thickness area and the second surface of the second thickness area are located on two surfaces of the carrier opposite to each other; and a signal reception and transmission assembly including a reception and transmission module and a connection module, wherein the reception and transmission module is communicatively connected to the connection module, the reception and transmission module is arranged on the first surface of the first thickness area, and the connection module is arranged at the carrier.

2. The signal transmission apparatus according to claim 1, wherein a second surface of the first thickness area and a second surface of the second thickness area are coplanar, and the second surface of the first thickness area is opposite to the first surface of the first thickness area.

3. The signal transmission apparatus according to claim 2, further comprising a processing assembly arranged on the second surface of the second thickness area, wherein:

the connection module includes a first connection unit and a second connection unit;

the first thickness area is provided with a hole extending along the thickness direction of the carrier;

the first connection unit is arranged in the hole;

the reception and transmission module is covered on the hole;

a first end of the first connection unit is communicatively connected to the reception and transmission module; and a second end of the first connection unit is communicatively connected to the processing assembly through the second connection unit.

4. The signal transmission apparatus according to claim 3, wherein:

the first thickness area and the second thickness area are multi-layer structures;

each layer structure of the first thickness area is aligned with each layer structure of the second thickness area; and a thickness of a layer structure near the first surface of the first thickness area is greater than a thickness of a layer structure near the first surface of the second thickness area.

5. The signal transmission apparatus according to claim 4, wherein:

a ground layer, a shield layer, and a transmission wire layer are arranged along the thickness direction of the carrier;

the second surface of the first thickness area and the second surface of the second thickness area form a second surface of the carrier;

the transmission wire layer is arranged on the second surface of the carrier; and the second connection unit is arranged on the transmission wire layer.

6. The signal transmission apparatus according to claim 5, wherein:

a shield structure is arranged on two sides of the second connection unit along the thickness direction of the carrier;

one end of the shield structure extends to the transmission wire layer; and the other end of the shield structure is connected to the ground layer.

7. The signal transmission apparatus according to claim 1, wherein:

the reception and transmission module includes a plurality of signal reception and transmission members arranged not on a same straight line;

a signal reception and transmission member includes a signal transmission member and a signal reception member; and at least two signal reception and transmission members are provided.

8. The signal transmission apparatus according to claim 1, wherein:

the carrier has a rectangular structure; and the first thickness area is arranged at edges of the carrier along a length direction and a width direction.

9. An electronic device comprising:

a housing;

a display panel arranged with a first gap between the display panel and the housing along an extension direction of the display panel;

a signal transmission apparatus including:

a first carrier including a first thickness area and a second thickness area connected to the first thickness area, wherein a thickness of the first thickness area is greater than a thickness of the second thickness area, a distance between a first surface of the first thickness area and a second surface of the second thickness area along a thickness direction of the first carrier is greater than the thickness of the second thickness area, and the first surface of the first thickness area and the second surface of the second thickness area are located on two surfaces of the first carrier is opposite to each other; and a signal reception and transmission assembly including a reception and transmission module and a connection module, wherein the reception and transmission module is communicatively connected to the connection module, the reception and transmission module is arranged on the first surface of the first thickness area, and the connection module is arranged at the first carrier.

10. The electronic device according to claim 9, further comprising a second carrier communicatively connected to the first carrier through a third connection unit.

11. The electronic device according to claim 9, wherein a second surface of the first thickness area and a second surface of the second thickness area are coplanar, and the second surface of the first thickness area is opposite to the first surface of the first thickness area.

12. The electronic device according to claim 11, wherein:

the signal transmission apparatus further includes a processing assembly arranged on the second surface of the second thickness area;

the connection module includes a first connection unit and a second connection unit;

the first thickness area is provided with a hole extending along the thickness direction of the first carrier;

the first connection unit is arranged in the hole;

the reception and transmission module is covered on the hole;

a first end of the first connection unit is communicatively connected to the reception and transmission module; and a second end of the first connection unit is communicatively connected to the processing assembly through the second connection unit.

13. The electronic device according to claim 12, wherein:

the first thickness area and the second thickness area are multi-layer structures;

each layer structure of the first thickness area is aligned with each layer structure of the second thickness area; and a thickness of a layer structure near the first surface of the first thickness area is greater than a thickness of a layer structure near the first surface of the second thickness area.

14. The electronic device according to claim 13, wherein:

a ground layer, a shield layer, and a transmission wire layer are arranged along the thickness direction of the first carrier;

the second surface of the first thickness area and the second surface of the second thickness area form a second surface of the first carrier;

the transmission wire layer is arranged on the second surface of the first carrier; and the second connection unit is arranged on the transmission wire layer.

15. The electronic device according to claim 14, wherein:

a shield structure is arranged on two sides of the second connection unit along the thickness direction of the first carrier;

one end of the shield structure extends to the transmission wire layer; and the other end of the shield structure is connected to the ground layer.

16. The electronic device according to claim 9, wherein:

the reception and transmission module includes a plurality of signal reception and transmission members arranged not on a same straight line;

a signal reception and transmission member includes a signal transmission member and a signal reception member; and at least two signal reception and transmission members are provided.

17. The electronic device according to claim 9, wherein:

the first carrier has a rectangular structure; and the first thickness area is arranged at edges of the first carrier along a length direction and a width direction.

* * * * *